United States Patent [19]

Hori

[11] Patent Number: 4,679,058

[45] Date of Patent: Jul. 7, 1987

[54] CASSETTE-TYPE PRINTING HEAD WITH PERFORATED FILM MEMBER

[75] Inventor: Keiichi Hori, Tokyo, Japan

[73] Assignee: Elm Company Ltd., Tokyo, Japan

[21] Appl. No.: 732,179

[22] Filed: May 7, 1985

[30] Foreign Application Priority Data

May 22, 1984 [JP] Japan ................................ 59-101845
Jun. 6, 1984 [JP] Japan ................................ 59-114685

[51] Int. Cl.[4] ...................... G01D 15/16; G01D 15/10; B41J 31/14

[52] U.S. Cl. ................................ 346/140 R; 400/197; 400/202.2; 346/76 PH

[58] Field of Search ....... 346/140 PD, 140 R, 76 PH; 400/197, 202, 202.2

[56] References Cited

U.S. PATENT DOCUMENTS

| | | | |
|---|---|---|---|
| 2,588,548 | 3/1952 | Markes | 346/140 R |
| 2,743,470 | 5/1956 | Horowitz | 400/202.2 |
| 4,067,017 | 1/1978 | Dertouzos | 346/76 PH |
| 4,399,348 | 8/1983 | Bakewell | 346/76 PH |
| 4,504,840 | 3/1985 | Evans | 400/197 |

*Primary Examiner*—E. A. Goldberg
*Assistant Examiner*—Mark Reinhart
*Attorney, Agent, or Firm*—Cislo & Thomas

[57] ABSTRACT

The present invention relates to a cassette-type printing head which comprises in combination: a cassette body for housing an ink, an ink guiding member in which one end portion thereof is immersed in the cassette body, and a film member having a plurality of holes or recesses for housing an ink which is contacted by the ink guiding member which protrudes from the cassette body.

11 Claims, 14 Drawing Figures

CASSETTE-TYPE PRINTING HEAD WITH PERFORATED FILM MEMBER

BACKGROUND OF THE INVENTION

The present invention relates to a cassette-type printed head, particularly to a cassette-type printing head for printing by jetting an ink which is housed in a plurality of holes or recesses which are shaped in a film member by a bubble pressure from heat of a thermal head.

In the conventional ink jet-type printer, a plurality of ink jet nozzles are used, and the ink is jetted into a printing paper by a piezo electric driving means.

SUMMARY OF THE INVENTION

In the aforementioned conventional type, there are many problems, i.e. in the case of the ink jet system, it is very difficult to eliminate a nozzle stoppage or blockage, whereby a white dot is printed on a printing paper by the nozzle stoppage (that is, no drop of ink reaches the paper). On the other hand, in the case of an ink ribbon type, ink disappears over a period of time; the printed density becomes paler as a result of several repetitive printing operations. Further, in the case of thermal transfer of hammer type, a coated tape must be discarded after one printing cycle. Therefore, a printer or typewriter and wordprocessor which must be able to print by supplying an ink continuously was not developed until now.

The present invention aims to eliminate the above-noted difficulties and insufficiencies. The object of the present invention is to provide a new cassette-type printing head which is composed of an ink tank for housing an ink, an ink guide member in which a part thereof is immersed in the ink tank, whereby a film member which has a plurality of holes and recess portions is contacted with a surface of the ink guide member.

BRIEF DESCRIPTION OF THE DRAWING

FIG. 1 shows a cross sectional view;

FIG. 2 shows a flat plan view of FIG. 1;

FIG. 3 shows a side view in which a cap member is covered thereon in FIG. 1;

FIG. 4 shows a flat plan view of FIG. 3;

FIG. 5 shows a perspective view of a serial printer in which the teachings of the present invention are applied thereto;

FIGS. 6 and 7 show a flat plan view and a front view for indicating a recording condition;

FIG. 8 shows a perspective view of the basic construction of the second embodiment;

FIG. 9 shows a construction view of the second embodiment;

FIG. 10 shows a perspective view of the basic construction view of a color recording system of second embodiment;

FIG. 11 shows a perspective view of a cassette printing head of the present invention;

FIG. 12 shows a vertical sectional view of FIG. 11;

FIGS. 13 and 14 show the flat plan views for indicating a location of a film width and sealing member.

DETAILED DESCRIPTION OF THE INVENTION

Figure 1:
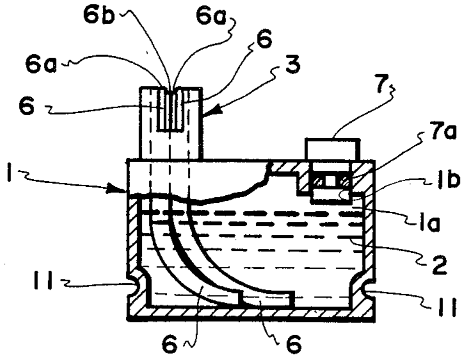
FIG. 1 to FIG. 6 show a first embodiment of the present invention.
Figure 2:
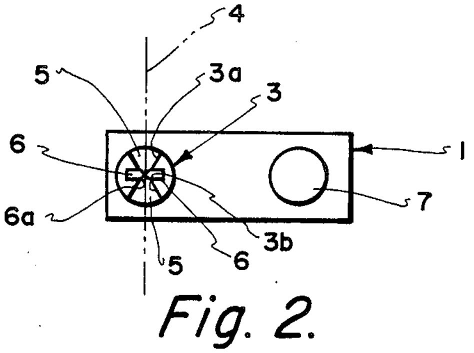

Referring now to the preferred first embodiment of the cassette-type printing head of the present invention, a cassette body 1 of a box shape is shown in FIG. 1. A liquid ink or a sintered liquid ink as an ink material 2 is housed in a cavity 1*a* of the cassette body 1. A cylindrical supporting member 3 which is shaped as one body is secured on one surface of the cassette body 1. A pair of recess portions 5, 5 for guiding a moving film are shaped to both sides of the supporting member 3. A film 4 having holes through openings of recesses 4*a* is able to pass through the supporting member 3 a right angle in an axial direction thereof. Further, a pair of ink guiding members 6, 6, which are made of a felt or fiber material, are mounted into each of recess portions 3*b*, 3*b* of the inner walls 3*a*, 3*a* of the supporting member 3. The end portions of the ink guiding members 6, 6 contact each other, and the curved portions 6*a*, 6*a* are shaped for easily inserting the film 4 therebetween. The film 4 is able to contact and slide with the ink guiding members 6, 6 in the contact portion 6*b*. The under portions of the ink guiding portions 6, 6 are immersed in the ink material 2 of the cassette body 1. A valve member 7 having an O-ring 7*a* for filling or changing ink is detachably mounted to an opened portion 1*b* of the cassette body 1.

Figure 3:
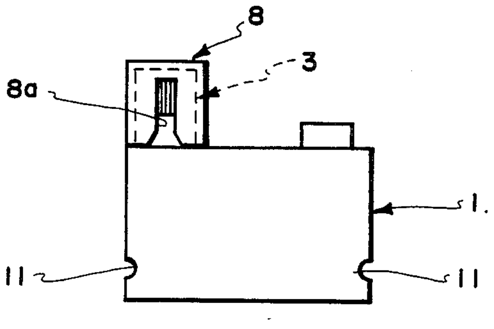
Figure 4:
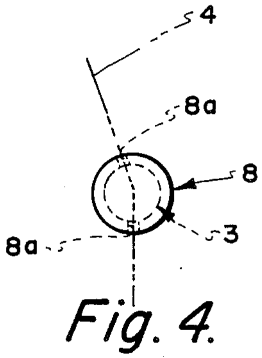

Numeral 8 in FIG. 3 is a cap member which has a cylindrical shape and is detachably mounted on the outer side surface of the supporting member 3. A pair of slit portions 8*a*, 8*a* are shaped in the side portion of the cap for guiding the film member 4 along the axial direction. In case of mounting the cap member 8 on the supporting member 3, the film 4 is able to slidaby move between the ink guiding members 6, 6, through the slits 8*a* and 8*a* and the recess portions 5, 5. Further, drying of the ink in the holes or recesses 4*a* of the film 4 and the ink guiding members 6, 6 is prevented by cap member 8.

Figure 5:
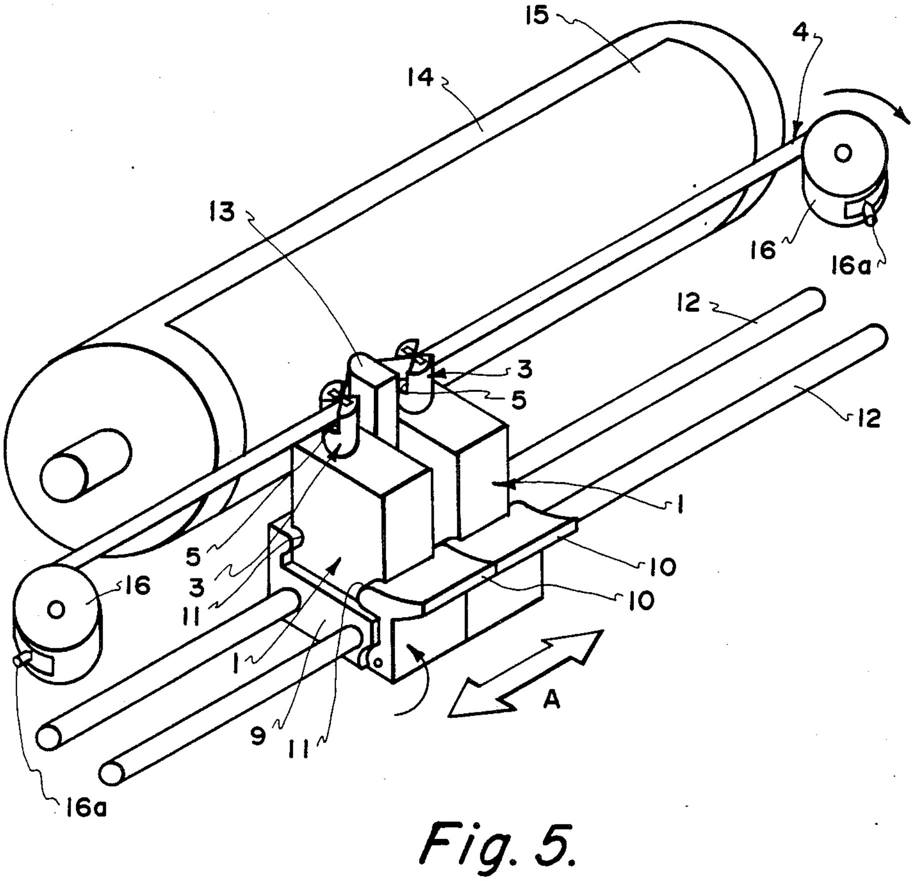

A mounting recess portion 11 for detachably mounting the cassette body 1 to a carriage member 9 as indicated in FIG. 3 is shaped to the side portion of the cassette body 1. In the embodiment of a serial printer of FIG. 5, a pair of cassette bodies 1,1 is mounted on the carriage member 9 which is movably positioned along the direction of arrow A according to a a pair of guide axes 12, 12. A pair of cassette levers 10, 10 detachably hold the cassette bodies 1, 1 in place on the carriage member 9. A thermal head 13 which is mounted on the carriage member 9 is located between the cassette bodies 1, 1. The supporting members 3, 3 are disposed on either side of the thermal head 13. Consequently, an ink material is supplied to the film 4 from either direction.

Figure 6:
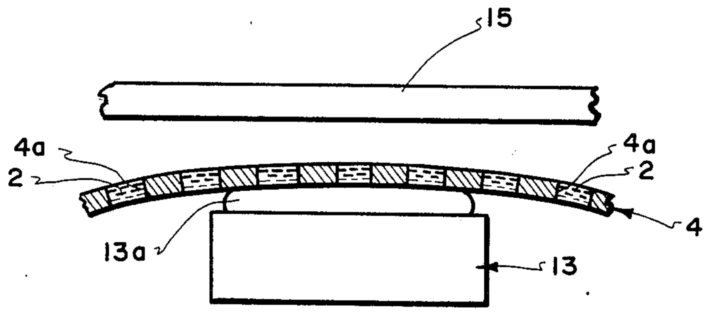
Figure 7:
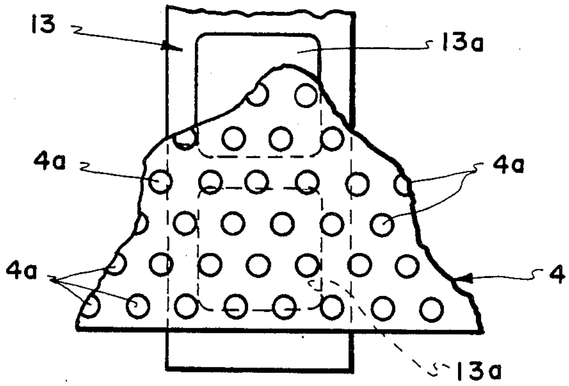

The film 4, which is guided and contacted with the supporting members 3, 3 and the thermal head 13, has a plurality of through openings, small holes or recess portions 4*a* as indicated in FIGS. 6 and 7. The ink material 2, which is supplied from the ink guiding portion 6, is filled in each of the small holes or recesses 4*a*, as shown in FIG. 6. When a signal current is applied to a heating surface 13*a*of a thermal head 13, the ink material of the small hole or recess 4*a* is jetted onto a recording paper sheet 15 to execute a printing. In this case, a plurality of the small holes and recesses 4*a* are registered to one dot element of the heating surface 13*a* (normally, the heating surface 13*a* is composed of a plurality of dot elements, each one dot element corresponds to one picture element). Therefore, even if one or two holes or recesses 4*a* are stopped up, the presence of several other holes or recesses 4*a* associated with the heating surface 13*a* prevents a no-printing condition for a single picture element.

Further, the film 4 is rolled by a pair of pulleys 16, 16 and is extended by a stationary pin 16*a*.

In the above noted first embodiment of the present invention, the thermal head 13 is held between a pair of cassette bodies 1,1. It is possible to obtain the same effect where the thermal head is mounted in a recess portion which is formed between the cassette bodies as one body. Further, it is possible to use one ink guiding member 6 in place of the pair of members 6, 6.

Figure 8:
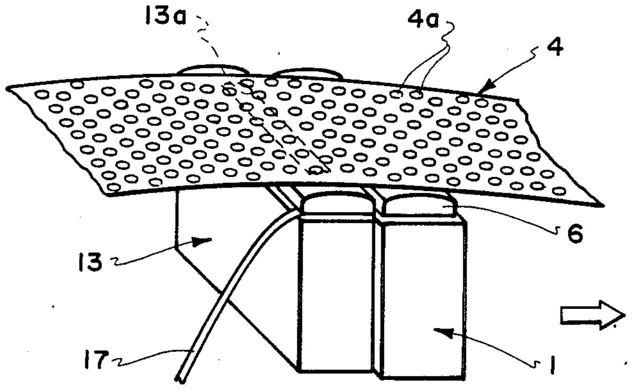
FIGS. 8 to 10 show a second embodiment of the present invention.
Figure 9:
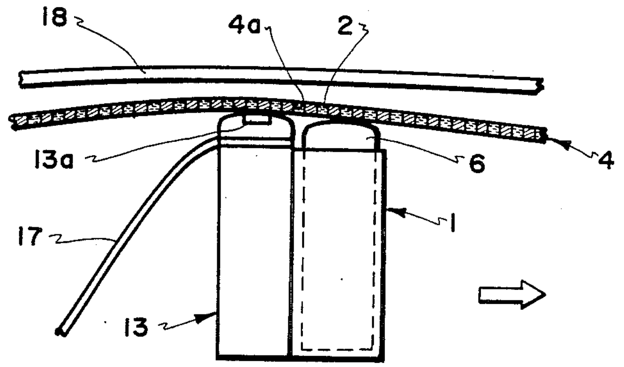
Figure 10:
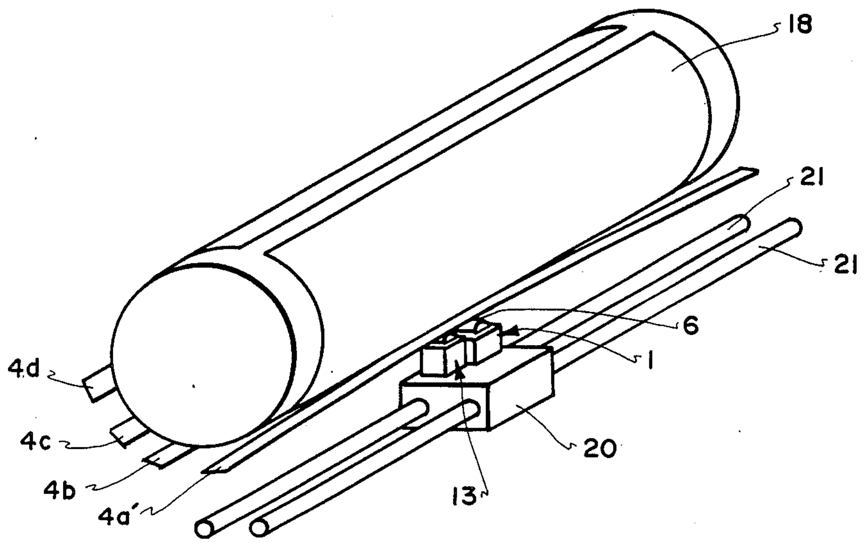
Figure 11:
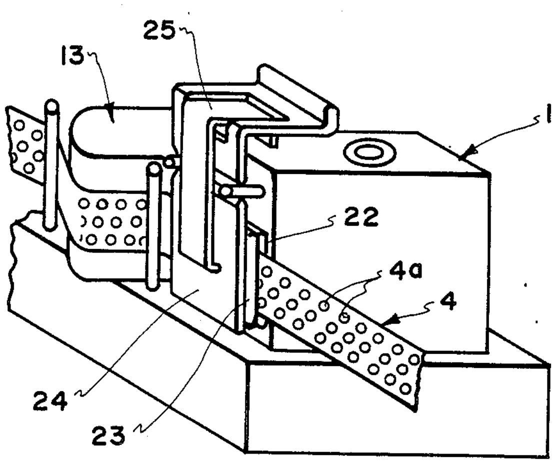
FIGS. 11 to 14 show a third embodiment of the present invention.
Figure 12:
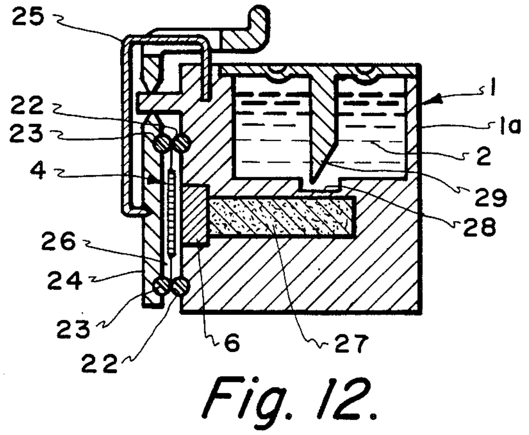

Referring now to the second embodiment of the present invention accompanying the drawings FIG. 8 to FIG. 10, FIG. 8 shows a basic construction of the present invention. Numeral 4 is a film which is made of a thin metal film of aluminum or an organic film of polyimide and has a plurality of holes 4*a*. The film 4 is of a desired length and width. Both ends of the film 4 are rolled, respectively. It is possible to use a new portion of the film 4 by taking out from a rolled portion whereby it is possible to prevent a plugged condition of the hole 4*a*. Numeral 13 is a thermal head member which has a plurality of thermal head elements 13*a*. Numeral 6 is an ink supplying member which is formed having the box-like shape of the cassette and has a ink filling inlet, with an ink filled in the ink supplying portion. The ink is supplied to the hole 4*a*. An ink guiding member 6 which is made of sponge contacts one surface of the film 4. The thermal head member 13 and ink supplying member 6 are formed in a cassette shape as one body and contact a surface of the film 4 and move serially when a recoding is performed. An ink 2 which is filled in the holes 4*a* of the film 4 is jetted onto the recording paper 18 by a bubble pressure caused by the heat of thermal dot element 13*a* through a nozzle of holes 4*a*.

FIG. 9 shows an explanatory figure for explaining the operation of the film 4 and thermal head 13. An ink 2 is filled into the hole 4*a*. The ink 2 is only heated by the thermal dot element 13*a* of the thermal head 13. Numeral 17 is a flexible cable to supply a drive signal to the thermal head 13 from the drive circuit (not shown).

FIG. 10 shows a basic construction of recording a color print. Numeral 18 is a recording paper which is rolled on a drum (not shown). Certainly, it is possible to use a paper of one passing type without using a rolled type. Numerals 4*a*', 4*b*, 4*c* and 4*d* are the films for Yellow, Magenta, Cyan and Black colors. The thermal head 13 and ink supplying member 6 are used as the same way as described above. Numeral 20 is a supporting base to support the head 13. A pair of supporting bars 21, 21 supports the head 13, analagous to bars 12, earlier described. Color printing is performed in a line detection by moving the recording head for each color in respect to a scanning operation on the recording paper.

According to the second embodiment of the preent invention, it is possible to simply record mono and color print by a simple mechanism. A stoppage of nozzle does not cause a problem, since it is possible to start a recording by laterally moving a film when the nozzle stoppage occurs. Thus, the invention is applicable to a copy machine or electronic typewriter.

Referring now to the third embodiment of the present invention accompanying the drawings of FIG. 11 to FIG. 14, a recording ink cassette 1 is applied to an ink jet printing system in which a recording ink is housed in a plurality of small holes or recesses 4*a* of a thin film 4 made of metal or organic material. An expanded recording ink 2 is jetted towards a recording paper (not shown) by contacting with the thermal head 13 with the film 4.

The recording ink cassette 1 is composed of a recording ink housing member 1*a*, a recording ink guiding member 6 which is connected to the housing member 1, a first sealing member 22 for sealing the housing member 1*a* and a pressing member 24 having a second sealing member 23 which opposes the first sealing member 22. The pressing member 24 is pressed by a spring member 25 as shown in the drawings.

The recording ink is filled in a sealed portion 26 which is enclosed by the sealing members 22 and 23 and is housed in the small holes or recesses 4*a* of the film 4 which passes through the recording ink 2. The recording ink guiding member 6 is contacted with the film 4. The sealing members 22 and 23 prevent leaking out of the recording ink to the outside and enable a uniform recording ink level in the small hole or recess 4*a* of the film 4 to be provided. The material of the sealing members comprises a plastic or rubber of silicone resin and fluorine resin which have good sliding characteristics. An O-ring shape thereof is preferable therefor.

Figure 13:
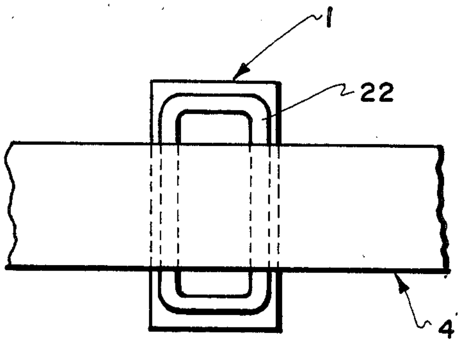
Figure 14:
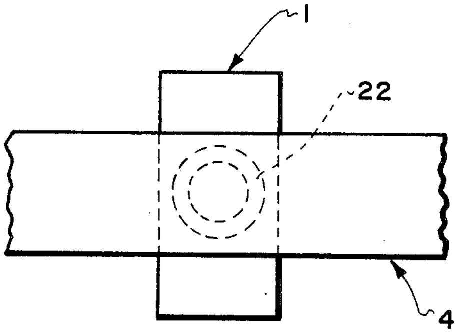

The width of the sealing members 22 and 23 is greater than the width of the film 4, as shown in FIG. 13. However, it is possible to prevent leakage of the recording ink if the material of the sealing member has a substantial elasticity. Further, it is possible to provide the sealing members 22 and 23 having a width smaller than the width of the film 4, as shown in FIG. 14.

A very thin sealing film 28 is placed in a connecting portion 27 between the housing member 1*a* and the recording ink guiding member 6. It is possible to easily break the sealing film 28 by pushing a protruding member 29 when using it whereby the recording ink 2 is supplied to the connecting portion 27 and the recording ink guiding member 6.

The connecting portion 27 is preferable for a cylindrical type in which a porous or fiber material is filled therein. Further, it is preferable to use a formation of porous material of sponge or felt which keeps the recording ink in the recording ink guiding member 6. The porous or fiber material operates as an absorbing material to prevent an outflow of the ink. Further it is possible to provide a filter for filtering out the particles in the ink or a broken piece of the sealing film 28.

As the preferred embodiment of the ink jet printing system, the film 4 is fixed and the recording ink cassette 1 and thermal head 13 are slidably contacted with the film 4. It is possible to mount the recording ink cassette 1 on both sides of the thermal head 13, thereby enabling a reciprocating recording therebetween.

According to the ink cassette for a printer of the present invention, an ink is constantly applied to a tape. It is possible to print in a constant density without density irregularity by changing the cassette body when the ink cavity becomes empty or the ink guiding member becomes worse.

What we claim is:

1. A cassette-type printing head comprising in combination: a fluid ink; at least one cassette body having a cavity for housing said ink; at least one ink guiding member in which one end thereof is immersed in said cavity containing said ink; and a film member having a plurality of through openings for at least temporarily capturing said ink, said film member being slidably contacted by said ink guiding member; and, a thermal head having a plurality of elements cooperatively associated with said film member, with several of said through openings of said film member alignable with each of said thermal head elements for heating said temporarily captured ink in said through openings and jetting said ink into a sheet material.

2. A cassette-type printing head as claimed in claim 1, having a supporting member having recess portions for guiding said film member which is mounted on one surface of said cassette body, with said ink guiding member mounted on a central portion of said supporting member.

3. A cassette-type printing head as claimed in claim 1, having a pair of said ink guiding members, with a pair of curved portions formed on the surfaces of contact portions of said ink guiding members.

4. A cassette-type printing head as claimed in claim 1, having a pair of said cassette bodies, with a thermal head disposed between said cassette bodies.

5. A cassette-type printing head as claimed in claim 1, having a valve member for adding an ink to said cassette cavity, said valve being detachably mounted to said cassette body.

6. A cassette-type printing head as claimed in claim 1, having a cap member having a slit portion for guiding a film, said cap member being detachably mounted on the outer surface of said supporting member.

7. A cassette-type printing head as claimed in claim 1, having a mounting recess portion provided on one side portion of said cassette body for detachably mounting said cassette body to another member.

8. A cassette-type printing head as claimed in claim 1, having a thermal head having a plurality of heating dot elements which is contacted by said cassette body, said thermal head and said cassette body being formed as one body.

9. A cassette-type printing head as claimed in claims 1 or 2, having a plurality of films and thermal heads, each provided with yellow, magenta, cyan or black color, whereby a color printing is performed.

10. A cassette-type printing head as claimed in claim 1, having a first sealing member for enclosing said ink guiding member and a pressing member having a second sealing member which opposes said first sealing member.

11. A cassette-type printing head as claimed in claim 1, wherein a very thin sealing film is employed as a connecting portion between said cassette body and said ink guiding member.

* * * * *